United States Patent
Mauffrey et al.

(10) Patent No.: US 6,581,512 B1
(45) Date of Patent: Jun. 24, 2003

(54) TOP FOR TOASTER

(75) Inventors: Guy Mauffrey, Breuchotte (FR); Dominique Marx, Golbey (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/257,601

(22) PCT Filed: Apr. 10, 2001

(86) PCT No.: PCT/FR01/01100
§ 371 (c)(1), (2), (4) Date: Oct. 15, 2002

(87) PCT Pub. No.: WO01/78567
PCT Pub. Date: Oct. 25, 2001

(30) Foreign Application Priority Data

Apr. 13, 2000 (FR) .............................. 00 04862

(51) Int. Cl.⁷ .............................. A47J 37/08; F24C 7/10
(52) U.S. Cl. .......................... 99/389; 99/329 P; 99/385; 99/391
(58) Field of Search ........................... 99/325–333, 337, 99/339, 338, 340, 341, 342, 385–393; 219/518–521, 396, 398, 492, 494, 497, 481, 489, 386; 392/373, 375, 337, 407

(56) References Cited

U.S. PATENT DOCUMENTS

| 1,893,989 A | * | 1/1933 | Galer | 99/390 X |
| 1,926,276 A | * | 9/1933 | Forbes | 99/332 |
| 1,967,209 A | * | 7/1934 | Lawrence | 99/327 |
| 1,979,845 A | * | 11/1934 | Schallis | 99/332 |
| 2,631,523 A | * | 3/1953 | Olving | 99/331 X |
| 2,764,081 A | * | 9/1956 | Glasser | 99/390 X |
| 4,345,513 A | * | 8/1982 | Holt | 99/401 X |
| 5,528,980 A | * | 6/1996 | McClean | 99/389 |
| 5,642,657 A | * | 7/1997 | Yeung et al. | 99/393 X |
| 5,647,270 A | * | 7/1997 | Rousseau et al. | 99/391 X |
| 5,664,481 A | * | 9/1997 | Huggler | 99/391 |
| 5,802,957 A | * | 9/1998 | Wanat et al. | 219/521 X |
| 5,943,948 A | * | 8/1999 | Tanaka | 99/391 X |

FOREIGN PATENT DOCUMENTS

| DE | 75 19 167 | 4/1976 |
| DE | 27 49 919 | 5/1979 |
| EP | 0 283 641 | 9/1988 |

OTHER PUBLICATIONS

"Toaster with Device for Reheating Rolls or Similar Foods," Guy Mauffrey et al, pending application No. 10/089,152.

* cited by examiner

Primary Examiner—Timothy F. Simone
(74) Attorney, Agent, or Firm—Browdy and Neimark, P.L.L.C.

(57) ABSTRACT

The toaster has a top that fits into the opening at the top of the toaster. The top consists of a peripheral plate (17) at the opening of the toasting chamber and having an upper rim (18), which may be pierced with a number of holes (20a, 20b). A peripheral flange (24) is connected to the plate by bridges (23) between the openings.

12 Claims, 4 Drawing Sheets

TOP FOR TOASTER

Figure 1:
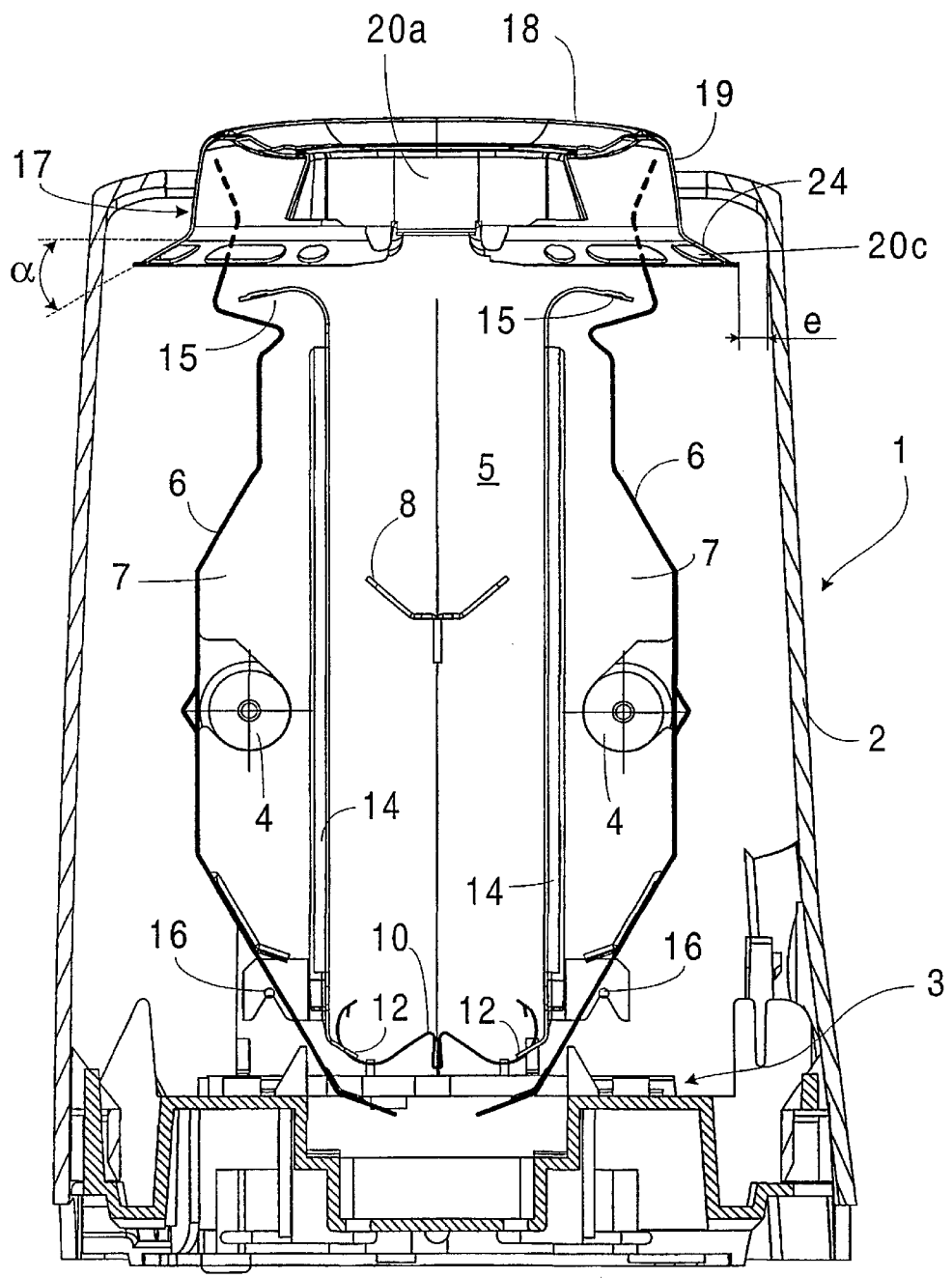

The present invention relates to the technical field of household electrical cooking appliances of the toaster type and concerns more particularly the upper part of said toaster closing the heating chamber and, in certain cases, the reheating of foodstuffs such as rolls or pastries for said toaster.

The present invention concerns an improvement in the tops for toasters described and developed particularly in the document FR 99 12257 particularly concerning reheating tops. In addition to the advantages already described in this document, the present invention concerns more particularly the reduction in the temperature presented by the top of the toaster at its periphery. In effect, notably when the top is of metal, the temperature obtained at the peripheral circumference is sufficiently high to cause elongation of the walls of the toaster at this circumference, thus generating a peripheral space between the housing and the top.

This space must often be maintained by spacers in order to avoid a possible contact between the top and the housing. In effect, the relative flexibility of the housing, most often made of plastic, permits the housing to be pressed against the top when it is gripped, which can lead locally to problems of dark burn marks, or a softening, or a local melting of the plastic.

The object of the present invention is to remedy the problems presented by the prior art by providing a toaster having a frame arranged in a housing, at least one vertical toasting chamber open in the upper part of the housing, heating means located proximate to the toasting chamber, a top constituted by a peripheral plate at the opening of the toasting chamber and having an upper rim, said top further being composed of a peripheral flange, characterized in that the flange is maintained with the plate by material bridges.

By material bridges, there is intended a long and narrow zone, in a manner to assure mechanical retention of the flange, but largely limiting thermal transfer by conduction from the center of the top toward the periphery of the flange.

This configuration permits, by the sufficiently low temperature presented by the flange of the top, either to avoid providing spacers such as previously described, between the top and the housing, or to bring the top closer to the housing up to the point of eliminating the annular space separating them, the peripheral flange then being in contact with the housing of the toaster. This latter solution presents the advantage of rigidifying the walls of the toaster without difficulty and without a supplementary part. By this rigidification, the walls of the housing of the toaster can be made thinner, reducing the quantity of material and thus the cost.

In a particular configuration of the invention, the lower peripheral flange of the top is located at the interior of the toaster housing. This avoids having the peripheral edge of the top project out, reducing the finishing work in order to eliminate the risks of injury to a user.

According to an advantageous embodiment, the plate is connected with the housing of the toaster by being for example placed on the toaster housing. By fixing the top onto the upper part of the toaster, the flange thus prolongs the housing of the toaster, thus eliminating the annular space, which permits, in addition to rigidifying the walls of the toaster, to exploit the reheating function of the top, while reducing the risk of introduction of crumbs or objects into the toaster. In order to assure a better mechanical maintenance, the plate can be connected securely to the housing of the toaster.

According to a particular form of the invention, the lower peripheral flange is inclined at an angle $\alpha$ with respect to the horizontal, this angle being at least equal to 30°. This inclination permits the heat flux coming from the rear face of the reflector to be oriented toward the central zones, while thermally protecting the housing.

According to a particular embodiment of the invention, at least one part of the rim of the plate is raised with respect to the upper part of the housing. Such an arrangement permits use of the top as a food reheater. This arrangement avoids having the bread rest directly on the housing which could then be at a high local temperature, either from the heat generated by the bread, but above all by blockage of the opening of the heating chamber. Most housing being made of plastic, an abnormal increase in temperature would create the risk of deteriorating it and leaving local burn marks.

Advantageously, the rim of the top has openings permitting a homogeneous distribution of the heat.

According to an advantageous configuration of this embodiment, the rim of the plate has bosses, such as to present support points at different heights. These bosses permit either raising at least one part of the rim of the plate with respect to the upper part of the housing, or, when the rim is entirely raised with respect to the housing, delimiting hollow zones for an easier positioning of the bread. Moreover, these bosses can be provided to arrange warm air passages under the bread, which is thus reheated in a more homogenous manner.

As a complement to, or a variation of, the preceding configuration, the openings in the rim of the plate are concentrated at the level of the zones for positioning the bread. Ascending warm air can thus escape into the hollow parts resulting from the bossing, which promotes a better distribution of the heat in the zones provided to receive the bread.

Advantageously, the rim of the plate has an incline toward the opening of the heating chamber, permitting, on the one hand, to better seat pastries above the opening of the toaster, and, on the other hand, to prevent the bread from coming into direct contact with the openings of the plate.

Figure 2:
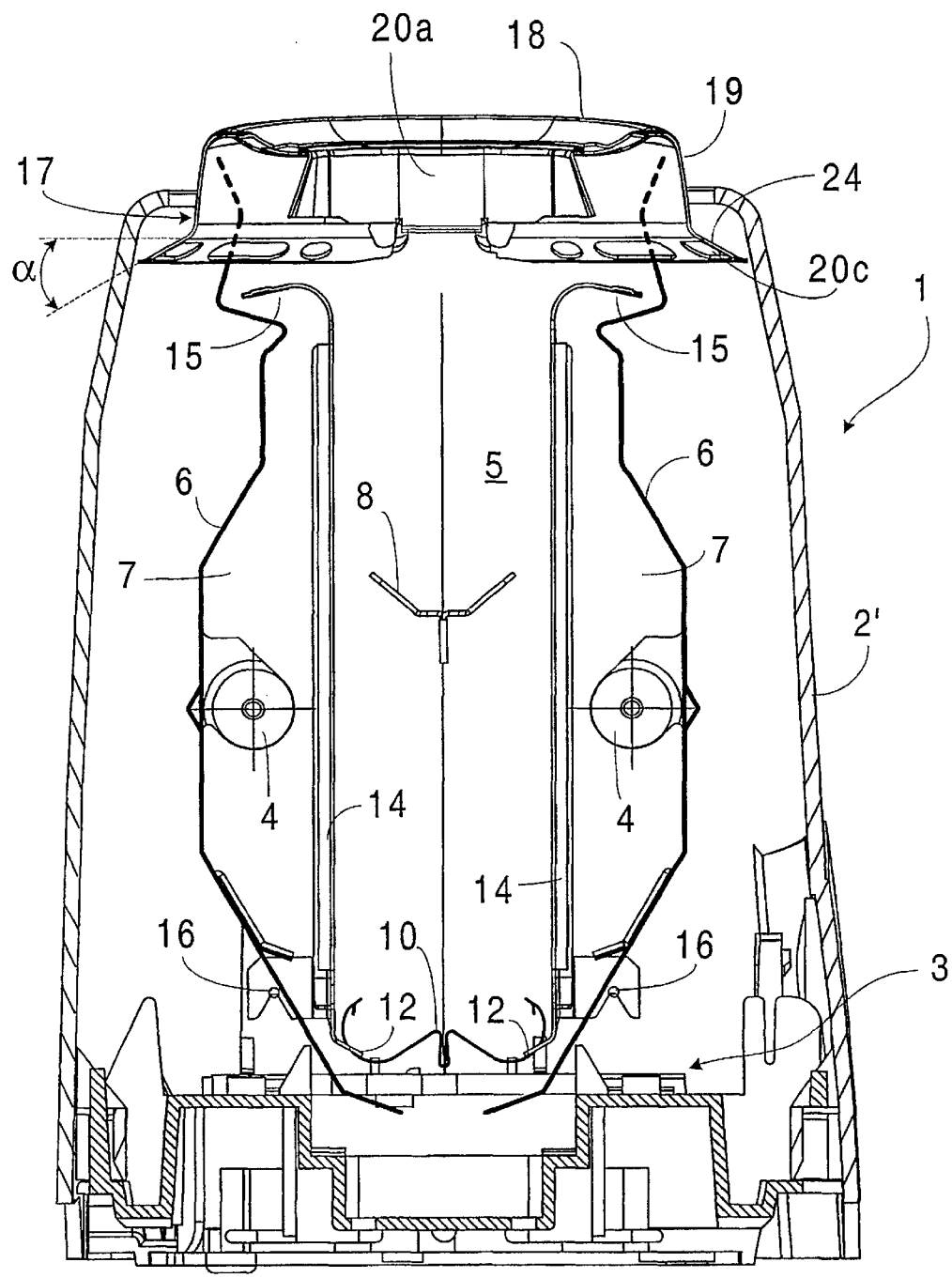
Figure 3:
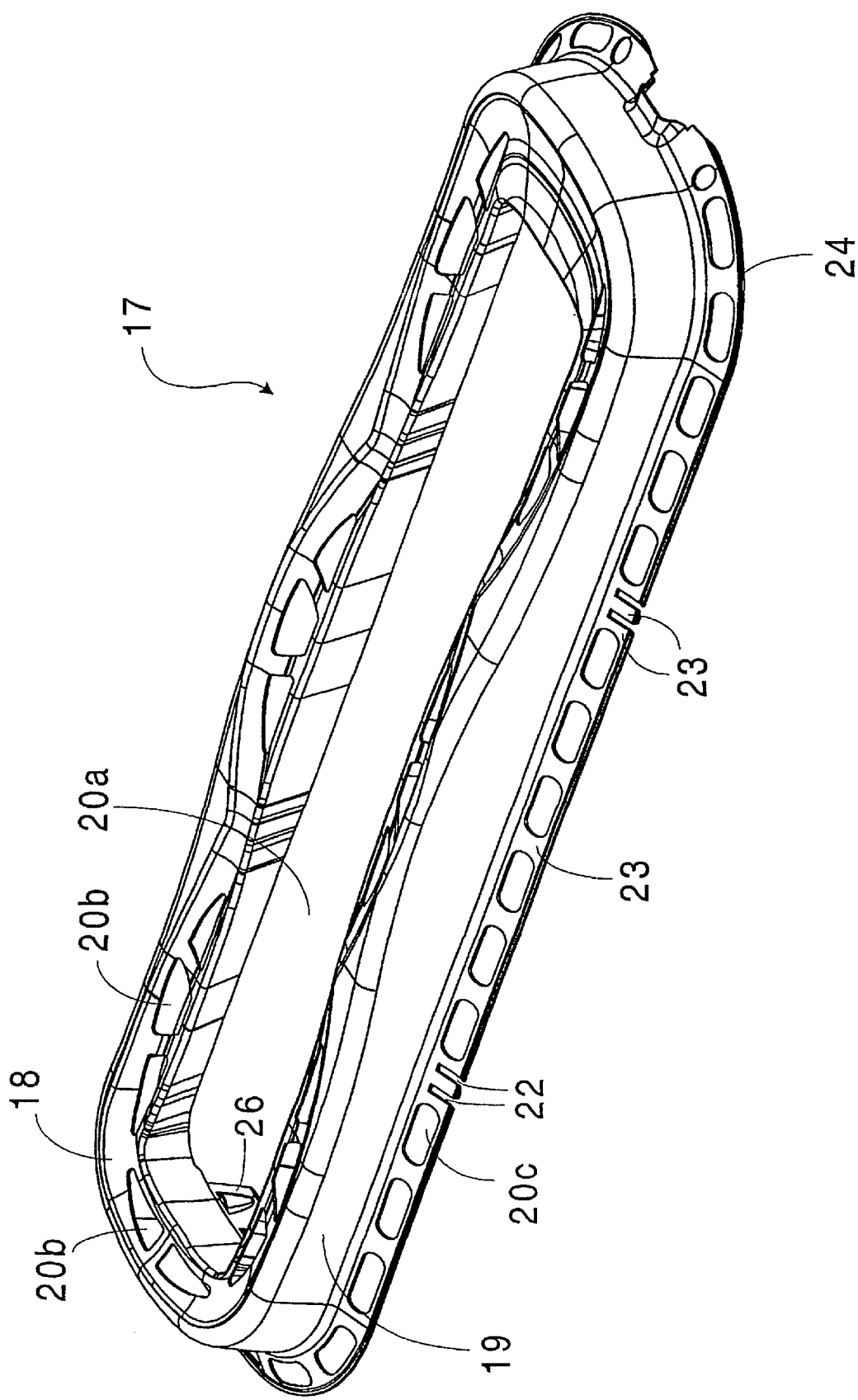
Figure 4:
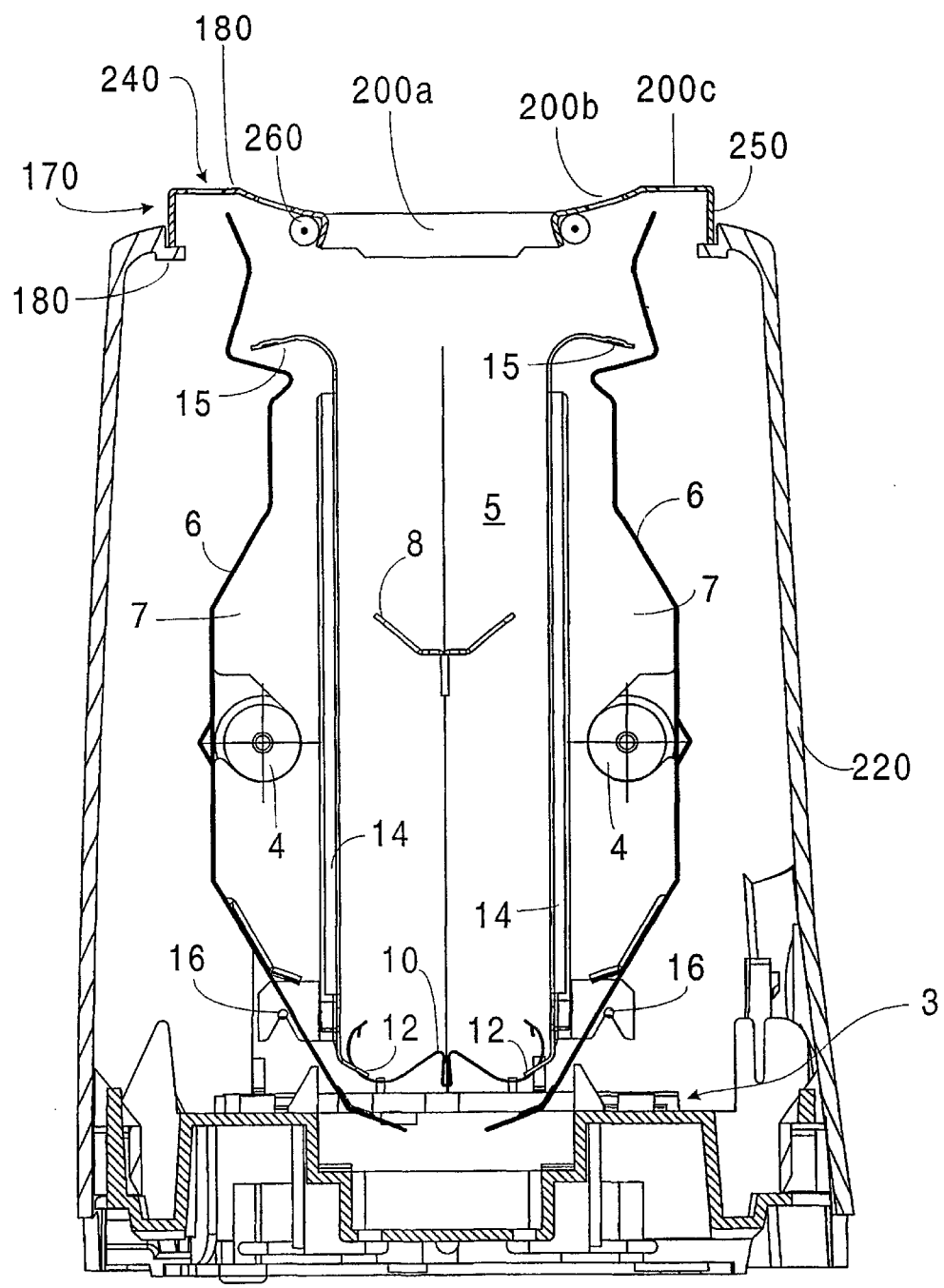

The present invention will be better understood with the aid of the description that will follow, with reference to the attached figures, given by way of non-limiting example, among which:

FIG. 1 is a partial cross-sectional view of a toaster according to a first configuration, the top being represented in a complete view, FIG. 2 is a partial cross-sectional view of a toaster according to a second configuration, the top being shown in a complete view, FIG. 3 is a perspective view of a food-reheating top for a toaster according to the present invention, FIG. 4 is a partial cross-sectional view of a third configuration of the invention.

The following example deals with a food-reheating top for a toaster. The present invention can equally be applied to more conventional toaster tops, not having the reheating function, and equipping toasters in order to partially close the heating chamber in order to limit access thereto and to assure the holding of the housing with the aid of insulating cross pieces or, due to the present invention, without cross pieces.

As is clearly visible in FIGS. 1 and 2, toaster 1 according to the present invention is composed of a housing 2 having an upper opening and at the interior of which is arranged a frame 3 composed particularly of two longitudinal reflectors 6 as well as two transverse walls 7 provided with notches in which are positioned heating elements 4. Two grids 14 define a heating chamber 5 that is open toward the upper part of the toaster.

Gripping grids 14 are pivoted around a point 16 and have a curved part 12 at their end situated in the low part of the toaster, this curved part 12 being oriented toward the interior of the chamber. In this zone is equally found a spring blade 10 capable of being displaced by a bread supporting carriage 8 when this latter is brought into the low part of the toaster.

Gripping grids 14, at their opposite end, i.e., at the top of the heating chamber, are curved in such a manner as to present a rim 15 substantially perpendicular to the plane defined by the grids, this rim being oriented toward the outside of the chamber.

According to a first embodiment of the invention, a top is arranged at the level of the opening of the housing, in its upper part. This top comprises a plate 17 having a main opening 20a that corresponds with the opening of heating chamber 5, a rim 18, as well as a vertical wall 19. At its base, the top presents a peripheral flange 24 located at the interior of housing 2. Rim 18 is oriented toward the opening of the heating chamber, in a manner peripheral thereto, as is clearly visible in FIG. 3.

According to the example presented, the top rests on frame 3 (not visible in the Figures).

Rim 18 of plate 17 also has openings 20b of which the form, the dimensions and the distribution can vary depending on the arrangement of the heating elements, the heating power . . . .

By way of example, the openings presented have an elliptical form. In order to indicate the reheating function, these holes can equally constitute pictograms, for example by having a form of croissants, in order to remind the user of the presence of this function on the toaster, such as shown in FIG. 3.

Advantageously, rim 18 of this plate is not flat and can present bosses situated between the openings, and/or an incline along the width of the rim. Other configurations can be envisioned without departing from the framework of the present invention, the principle being to present bread support zones that are raised with respect to housing 2 and, advantageously, with respect to openings 20b.

According to the invention, lower peripheral flange 24 is connected to plate 17 by material bridges 23, as is clearly visible in FIG. 3, these bridges limiting heat transfer by conduction from the center of the top. At least 50% of the material of flange 24 is eliminated by formation of openings 20c and/or indentations 22. The distribution and the dimension of the material bridges results from a compromise between the mechanical integrity of the flange and the transfer by conduction of the heat generated at the level of plate 17, as well as suitable heating of flange 24 by convection.

Temperature measurements have shown, in a toaster with a double slot, that for a temperature of 260° C. at the center of the reheating top, the present invention permits this temperature to be lowered to values below 120° C. at the periphery of the top placed on the housing, by the material bridges formed.

The temperatures present at the top depend particularly on the type of toaster utilized, on the heating power, on the form of the flange and the material bridges, on the arrangement of the flange with respect to the housing, as well as the materials used for the top, the present invention not being limited to only metal materials.

One hopes for an improvement of around 50° C. between the temperature measured before the material bridges and that measured after said bridges. This drop in temperature thus permits expanding the range of materials possible for the fabrication of the housing of the toaster.

According to the first embodiment presented in FIG. 1, a distance e separates the top of housing 2 from the toaster, in a manner known per se. However, by the notable reduction in the temperature at the periphery of the top, the housing can be made of plastic without using a spacer to maintain it at a distance from the top. The plastic utilized should however have a good temperature resistance, in order that the contact between the housing and the top during a brief instant does not deteriorate it. However, the range of temperature presented by the periphery of the top permits the quality of the plastic utilized to be substantially reduced.

According to a second embodiment, presented in FIG. 2, the top is brought close to housing 2' in order to present uniquely a functional set with the walls of said housing. This arrangement permits the housing to be made rigid, permitting, in a certain measure, reducing the thickness of the housing, resulting in a saving of material.

With a view to simplification of the arrangement of the toaster and in order to reduce the number of parts of the toaster, plate 17 forms a unit with frame 3. According to an advantageous variant, plate 17 is an extension of frame 3.

In operation, the upper parts of the grids approach one another while gripping the bread, acted on by the bread supporting carriage 8. This latter is maintained by known means of the mechanical or electromechanical type in the lower part of the toaster during the programmed toasting time or until the desired degree of toasting of the bread when the heating elements cease to be supplied electrically. A mechanism then permits upward movement of the bread supporting carriage toward a position for removing the bread. The grids are then found in their starting position. This constitutes a conventional operation of the toaster.

In order to further limit the increase of temperature of the housing, notably by radiation and convection, there can be provided a covering between vertical wall 19 of plate 17 and an extension of reflector 6, thus constituting a double protection wall of the housing.

For reheating rolls and similar food products, the principle remains similar to that of a toasting operation, aside from the positioning of the bread, located on plate 17 and not on the bread supporting carriage. By the same principle as previously explained, grids 14 close toward one another under the action of displacement of bread supporting carriage 8. Under the effect of the supplying of heating elements 4, ascending hot air rises in the toaster, by convection. The form of reflectors 6, as well as that of rims 15 of grids 14 permits the central flow of heat to be limited by slowing the convection flow and laterally orienting a part of said flow.

Moreover, the upper part of reflectors 6 is equally designed in order to not only retain the heat within the toaster, but also to orient latter toward openings 20b of rim 18 of plate 17 in the reheating mode.

According to the examples presented, flange 24 is inclined angle $\alpha$ with respect to the horizontal. By this arrangement rising in the toaster outside of the heating chamber, emitted by the rear face of reflector 6, is oriented toward holes 20b acting as a reflector. This effect contributes reduction in the temperature of the flange.

A good efficiency of this configuration is obtained for angle $\alpha$ at least equal to 30°.

According to one embodiment of the invention, the power is modified whether in the toasting mode or the reheating mode thus eliminating the need for a special control for the reheating function, or a different electric supply circuit the heating elements.

According to a variant of construction of the invention, provision can be made to reduce the power, when the user wants to reheat rolls. To this effect, several technical solutions are possible, for example a voltage divider bridge permits reduction of the supply voltage for the heating elements, alternating cycling of on and off periods for the heating elements.

According to this form of construction, it is necessary to provide a selector button that permits this power reduction function to be activated. This can be achieved with the addition of the time control button, thus reducing the number of interactions with the user.

The present invention is not limited to the examples proposed and can notably be applied to a toaster having more than one heating chamber.

In addition, by sufficiently reducing the peripheral temperature by a reduction of the material bridges, the top can be fixed directly onto the housing, without a space or spacers between these two parts, and without risk of damaging the housing.

FIG. 4 shows such a configuration, the top being constituted by a plate 170 bearing on a horizontal rim 180 formed at the interior in the housing of the toaster. Plate 170 has an upper rim 180 provided with openings 200a, 200b, and 200c having substantially the same functions and the same properties as, respectively, openings 20a, 20b, 20c previously described, imparting to said flange, by the reduction of the material of bridges thus generated, substantially the same thermal braking characteristics as those previously mentioned.

In addition to the functions already described, flange 240 thus serves equally as a pedestal for the top by its part 250 for connection with the walls of the housing 220 of the toaster.

This configuration, where the flange plays the role of pedestal for the top, permits, in addition to avoiding the introduction of bread crumbs outside of the heating chamber, rigidifying the housing of the toaster by the cooperation between part 250 of the flange and the walls of housing 220 of the toaster.

Such a top can have bosses permitting a better circulation of air, as previously described.

An additional variation, according to any one of the configurations envisioned, relates to an additional heating means for the top, dependent on or independent of the heating means for the heating chamber (or chambers). Such heating means can be constituted, for example, by low power heating elements 260 of the sheathed type, such as shown in FIG. 4. These elements are connected, in this example, directly under the top.

Other heating means can be envisioned without departing from the framework of the present invention, such as a resistive element deposited by silk screening, a conductive oxide layer, . . . .

Moreover, the invention is not limited to a continuous flange. In effect, for economic reasons, a discontinuous flange can be envisioned without departing from the framework of the present invention, the flange being present at the periphery of the top at the necessary locations, particularly to assure the mechanical maintenance of the walls of the housing of the toaster.

What is claimed is:

1. A toaster (1) having a housing (2, 2', 220) provided with an upper part, a frame (3) arranged in said housing, at least one vertical toasting chamber (5) having an opening in the upper part of the housing (2, 2', 220), heating means (4) located proximate to the toasting chamber (5), a top constituted by a peripheral plate (17, 170) at the opening of the toasting chamber (5) and having an upper rim (18, 180), said top further being composed of a peripheral flange (24, 240), wherein the flange (24, 240) is joined to the plate (17, 170) by material bridges (23).

2. The toaster according to claim 1, wherein at least 50% of the material of the flange (24, 240) of the top is eliminated by formation of openings (20c, 200c) and/or indentations (22).

3. The toaster according to claim 1, wherein the peripheral flange (24, 240) of the top is in contact with the housing (2, 2', 220) of the toaster.

4. The toaster according to claim 1, wherein the peripheral flange (24) of the top is inclined at an angle α with respect to the horizontal, this angle being at least equal to 30°.

5. The toaster according to claim 1, wherein the lower peripheral flange (24) of the top is located at the interior of the housing (2, 2') of the toaster (1).

6. The toaster according to claim 1, wherein the peripheral flange (240) of the top is placed on the housing (220) of the toaster (1).

7. The toaster according to claim 1, wherein at least one part of the upper rim of the plate (17, 170) of the top is raised with respect to the upper part of the housing (2, 2', 220).

8. The toaster according to claim 7, wherein the upper rim (18, 180) of the top is provided with openings (20a, 20b, 200a, 200b, 200c).

9. The toaster according to claim 7, wherein the upper rim (18, 180) of the plate (17, 170) has bosses, such as to present support points at different heights.

10. The toaster according to claim 9, wherein the openings (20a, 20b, 200a, 200b, 200c) in the upper rim of the plate (17, 170) are concentrated at the level of zones for positioning the bread.

11. The toaster according to claim 7, wherein the upper rim (18, 180) of the plate (17, 170) has an incline toward the opening of the toasting chamber.

12. The toaster according to claim 1, wherein the plate (17, 170) is connected with the housing (2, 2', 220) of the toaster (1).

* * * * *